US007607167B1

(12) United States Patent
Johnson et al.

(10) Patent No.: US 7,607,167 B1
(45) Date of Patent: Oct. 20, 2009

(54) SECURE GATEWAY/ROUTER

(75) Inventors: Tony L. Johnson, Mount Vernon, IA (US); Greg L. Shelton, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 800 days.

(21) Appl. No.: 11/167,380

(22) Filed: Jun. 27, 2005

(51) Int. Cl.
*G06F 7/04* (2006.01)
*G06F 17/30* (2006.01)
*G06F 15/16* (2006.01)
*H04L 29/06* (2006.01)

(52) U.S. Cl. .......................... 726/3; 713/166; 709/201

(58) Field of Classification Search .................. 726/3; 713/166; 709/201
See application file for complete search history.

(56) References Cited

U.S. PATENT DOCUMENTS

2004/0225883 A1* 11/2004 Weller et al. ................ 713/166
2005/0138110 A1* 6/2005 Redlich et al. .............. 709/201
2007/0277034 A1* 11/2007 LiVecchi .................... 713/166

* cited by examiner

*Primary Examiner*—Shin-Hon Chen
(74) *Attorney, Agent, or Firm*—Daniel M. Barbieri

(57) ABSTRACT

The present invention is directed to a secure gateway/router system and method for allowing a MLS network which simultaneously contains data of multiple security levels to interface with one of several MSLS networks which is configured to maintain data with a single security level. When the data is within the secure gateway/router system, the separation of the data by security levels, as it was received from the MLS network, is maintained by routing the data to a designated security level network. Secure gateway/router system includes several network interface units. Each network interface unit is configured to interface within a single MSLS network. Each MSLS software partition has a single and simple function to perform in maintaining separation of security levels and provide the data to the network interface unit configured to interface within the designated security level network.

29 Claims, 7 Drawing Sheets

SECURE GATEWAY/ROUTER

FIELD OF THE INVENTION

The present invention generally relates to the field of secured communication network systems, and particularly to a system and method for providing a secure gateway/router between devices operating at different security levels.

BACKGROUND OF THE INVENTION

A secured communication system for military applications provides high bandwidth and support users who operate at different security levels. The requirements depend on the type of information being communicated and upon the parties involved in the communication. In a secured communication network, data may be classified into levels of security. Different classification (security) levels are defined based on potential damage if compromised, thus requiring treatment rules. Different classification levels may include Unclassified, Confidential, Secret and Top Secret. MSLS networks are physically separated networks enforcing the different security levels. Secured communication networks may include Multiple Levels Security (MLS) networks, Multiple Single Level Security (MSLS) networks and the like.

MLS networks provide a means of transmitting data of different classification levels over the same physical network. Data integrity protection, separation of data types, access control, authentication and user identification and accountability, and the like are necessary for ensuring security. For example, when data is on the MLS network, the data is labeled with its security level information. The MLS network ensures that the data and the label are not separated and that data of different security levels are not co-mingled.

When the data is on the Multiple Single Level Security (MSLS) network, the data is kept separate by physical separation of the networks and thus, there is no opportunity for data of different security levels to co-mingle.

In addition, transforming military services to network centric services requires the secured communication networks to have connectivity to multiple radios operating at different security levels (i.e. MLS systems such as Joint Tactical Radio Systems (JTRS)). Many embedded software products for network centric services are required to meet certain levels of security as defined by the Common Criteria. Common Criteria defines seven different security levels called Evaluated Assurance Levels (EAL), ranging from one to seven, with one being the lowest level and seven being the highest level. While Common Criteria does not require the use of EALs, it is generally accepted as the best means for defining the security level of Operating Systems.

When networks connect a real time embedded world of avionics and military multi-level applications, data streams may have to be transmitted between the MLS Networks and the Multiple Single Level Security (MSLS) networks while maintaining desirable security separation. However, the MSLS networks are physically separated and require security certifications. Further, the MSLS networks typically have inadequate interfacing capability with the MLS networks. A secure interface between MSLS networks and MLS networks may be provided via additional hardware (such as a host processor, a host NIC and the like) for each security level, which is very costly and complex.

Therefore, it would be desirable to provide a system and method for providing a secure gateway between MLS networks and MSLS networks while maintaining security separation. It would be further desirable to provide such a system and method which meets high certification requirements.

SUMMARY OF THE INVENTION

Accordingly, the present invention provides a system and method for a secure gateway/router supporting interfaces among different devices operating at different security levels while maintaining high Evaluation of Assurance Level certifications.

In an exemplary aspect of the present invention, a secure gateway/router system allowing devices in the MLS networks to interface with trusted devices in MSLS network while maintaining proper security separation is provided. The secure gateway/router system may include a MILS router processor having MILS real time Operating System (OS) and MILS middleware. The secure gateway/router system may include a MILS network interface unit coupled to the MILS router processor. The MILS network controller may be configured to provide interfaces between the MILS router processor and classified domains. The classified domains are MSLS networks including a Secret Ethernet network (S network), a Top Secret Ethernet network (TS network) and the like. The MILS network controller may be coupled to at least two different single security level networks and configured to provide interfaces with the coupled single security level networks. The MILS router processor may be coupled to an additional network interface unit (NIU) configured to provide interfaces between the MILS router processor and unclassified domains. The unclassified domain networks include a Sensitive But Unclassified network (SBU network) and the like.

In an additional aspect of the present invention, the MILS router processor includes a MILS router application having several software partitions. The software partitions in the MILS router application include a MLS network interface software partition, a MLS router software partition and several MSLS software partitions. The MSLS software partitions are key enablers to enforce security policy among several single level security networks. Routing decisions made in the MILS router processor are based on labels within data packets received from the MLS network and a security level of one of the MSLS networks.

When the MILS router processor receives MSLS data from one of MSLS networks, the MSLS data may be forwarded to a proper MSLS software partition of the MILS router application. The MSLS data may be provided to the MLS router software partition. Then, the MLS router software partition may generate a MLS data packet by attaching proper labels. The generated MLS data packet may be sent to the MLS network.

When the MILS router processor receives data packets from the MLS network, the data packets may be received through the MLS network interface software partition. The MLS router software partition may determine a destination single security level network for the data packet based on labels extracted from the data packet. The labels may be striped from the data packet to generate MSLS data suitable for MSLS networks meeting low Evaluation Assurance level requirements. Then, the MSLS data is provided to a proper MSLS software partition via the MILS middleware. The proper MSLS software partition is configured to provide interfaces with the destination single security level network.

The MILS middleware may be configured to provide inter partition communication services within the MILS router application. The MSLS data is provided to a network protocol stack in the proper MSLS software partition. The MSLS data is sent to the destination single security network by the network protocol stack via the network interface unit. Each network protocol stack has visibility to a single network (with a single security level), which is enforced by the MILS real time Operating System and a Memory Management Unit (MMU) embedded in the MILS router processor. Additionally, the MILS router processor may send/receive data from a crypto engine prior to routing.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

The present invention provides a secure gateway/router system and method for allowing a MLS network that simultaneously contains data of multiple security levels to interface with one of several MSLS networks which is configured to maintain data with a single security level. When the data is within the secure gateway/router system, the separation of the data by security levels, as it was received from the MLS network, is maintained by routing the data to a designated network based on labels having the security level information. A high level of assurance may be maintained by partitioning the MILS router application into several MSLS software partitions. The MSLS software partitions are key enablers to enforce security policy among several single level security networks. Each MSLS software partition may have a single and simple function to perform in maintaining separation of security levels. The secure gateway/router system includes several network interface units configured so that a single software partitions can perform a single function that is critical to maintain separation.

Figure 1:
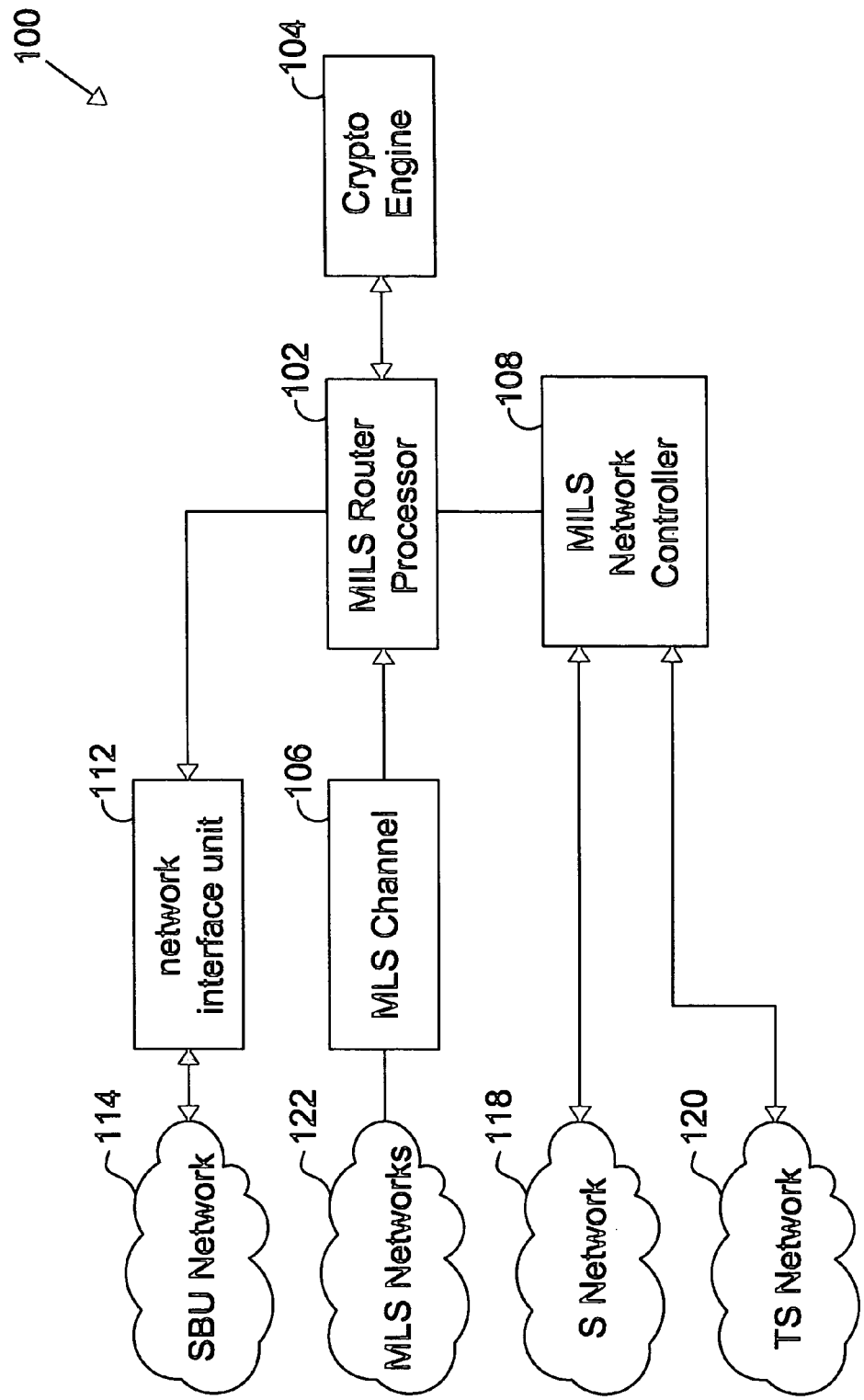
FIG. 1 illustrates a block diagram of a secure gateway system in accordance with an exemplary embodiment of the present invention.

Referring now to FIG. 1, a block diagram of a secure gateway/router system 100 in accordance with an exemplary embodiment of the present invention is shown. The secure gateway/router system includes a MILS router processor 102 including MILS Real Time Operating System (RTOS), a MILS router application, MILS middleware and a Memory management Unit. The secure gateway/router system 100 includes a MILS network controller 108 coupled to the MILS router processor 102. The MILS network controller 108 may be a MILS network interface card configured to provide interfaces with classified domains 118, 120. The MILS network interface card is coupled to several single security level networks 118, 120. The MILS network interface card is suitable for forwarding received data to a designated single level security network. The levels of security (Top Secret, Secret, Confidential and Unclassified) are based on potential damage if compromised and defines treatment rules. Examples of the single security level network 118, 120 include a Secret Ethernet network (S network), a Top Secret Ethernet network (TS network), and the like.

The MILS router processor 102 may include an additional network interface unit (unclassified network interface unit) 112 configured to provide an interface within an unclassified domain network 114. The unclassified domain network 114 includes a Sensitive But Unclassified network (SBU network) and the like. The MILS Router Processor 102 may be coupled to a MLS channel 106 receiving data packets from the MLS networks 122. It is to be noted that the MLS channel includes various interface channels. For example, the MLS channel 106 may include a radio interface channel such as an RS-232 interface channel. It is well known to the art that RS-232 interface is the Electronic Industries Association (EIA) standard for the interchange of serial binary data between two devices.

In an embodiment of the present invention, the safe gateway/router system 100 may include a cryptographic engine 104. The cryptographic engine 104 may include a reprogrammable cryptographic engine. Conventionally, cryptography is the widely used means for protecting information confidentiality and integrity. The use of cryptography allows much of the secured communication system to be built with commercial off-the-shelf (COTS) network components (NICs, switches, routers, firewalls or the like). In an embodiment of the present invention, the cryptographic engine 104 may be packaged on same or separate form factor assembly.

In an alternative embodiment of the present invention, the secure gateway/router system 100 may include a radio interface unit (not shown) coupled to Military Standard (MIL-STD) 1553 data bus receiving data from 1553 provision radio devices. Examples of the 1553 provision radio devices include aircraft radio devices and the like. MIL-STD 1553 is a DOD Military Standard, which uses a Balanced (Differential) interface. The interface is dual redundant with between 2 and 32 interface devices on the bus. The multiplex data bus system shall function asynchronously in a command/response mode and transmission shall occur in a half-duplex manner. The information flow on the data bus shall be comprised of messages which are, in turn, formed by three types of words (command, data, and status). In the alternative embodiment, an additional processor such as a radio management processor may be coupled to the MILS Router Processor. The additional processor (e.g. radio management processor) may be coupled to the radio interface unit and configured to provide datalink translation and control for the radio/datalink being used.

Figure 2:
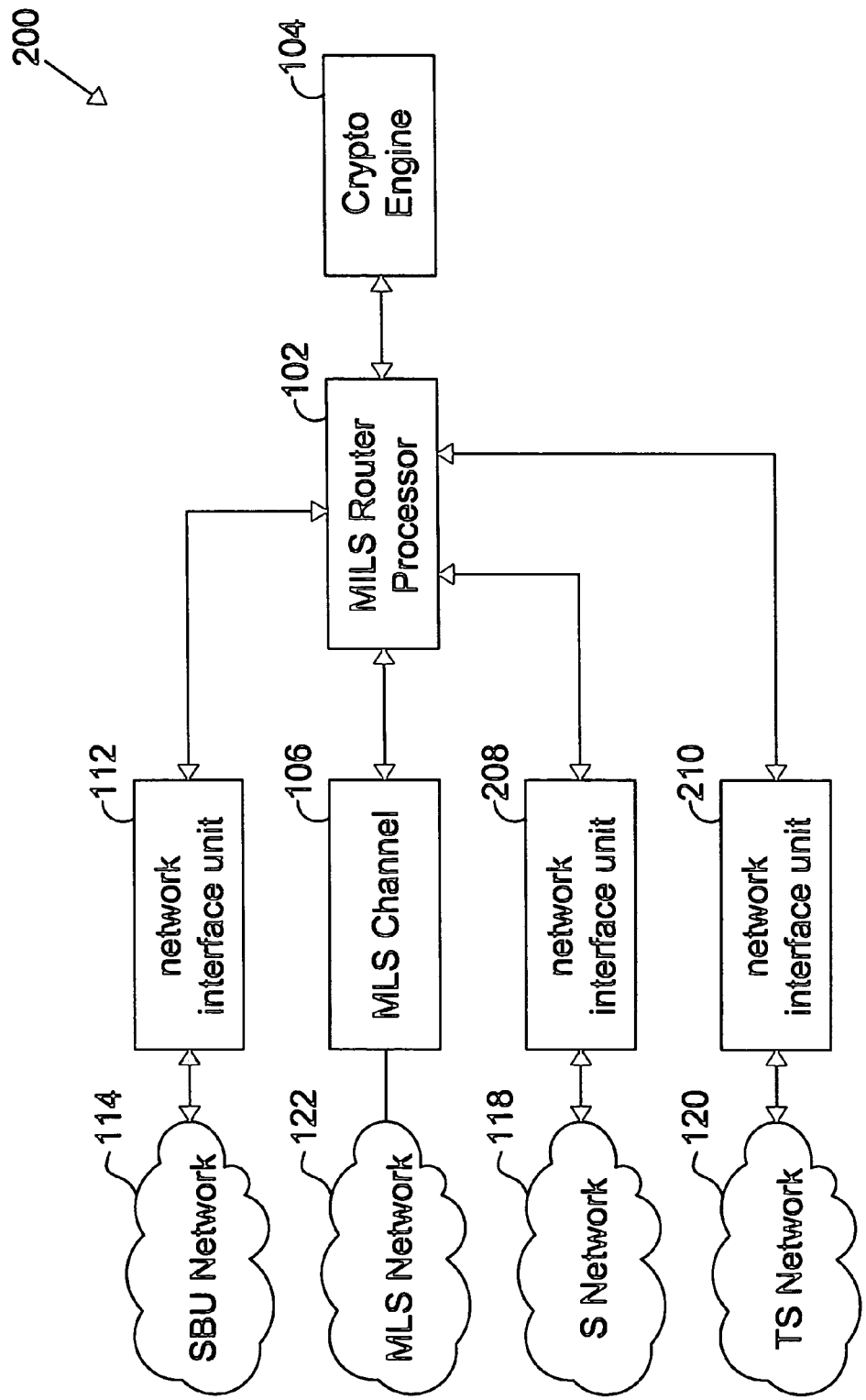
FIG. 2 illustrates a block diagram of a secure gateway system in accordance with an alternative embodiment of the present invention.

In another alternative embodiment of the present invention, the secure gateway/router system may include several network interface units which are not MILS network controllers. As shown in FIG. 2, the secure gateway/router system 200 may include at least two network interface units 208, 210 configured to provide interfaces with classified domains 118, 120. Examples of the network interface units may include layer 2 Ethernet routers with 10 ports, layer 3 Ethernet routers with 10 ports, and the like. Each network interface unit 208, 210 is coupled to a single security level network 118, 120 and configured to interface with the coupled single security level network 118, 120. The levels of security (Top Secret, Secret, Confidential and Unclassified) are based on potential damage if compromised and defines treatment rules.

Figure 3:
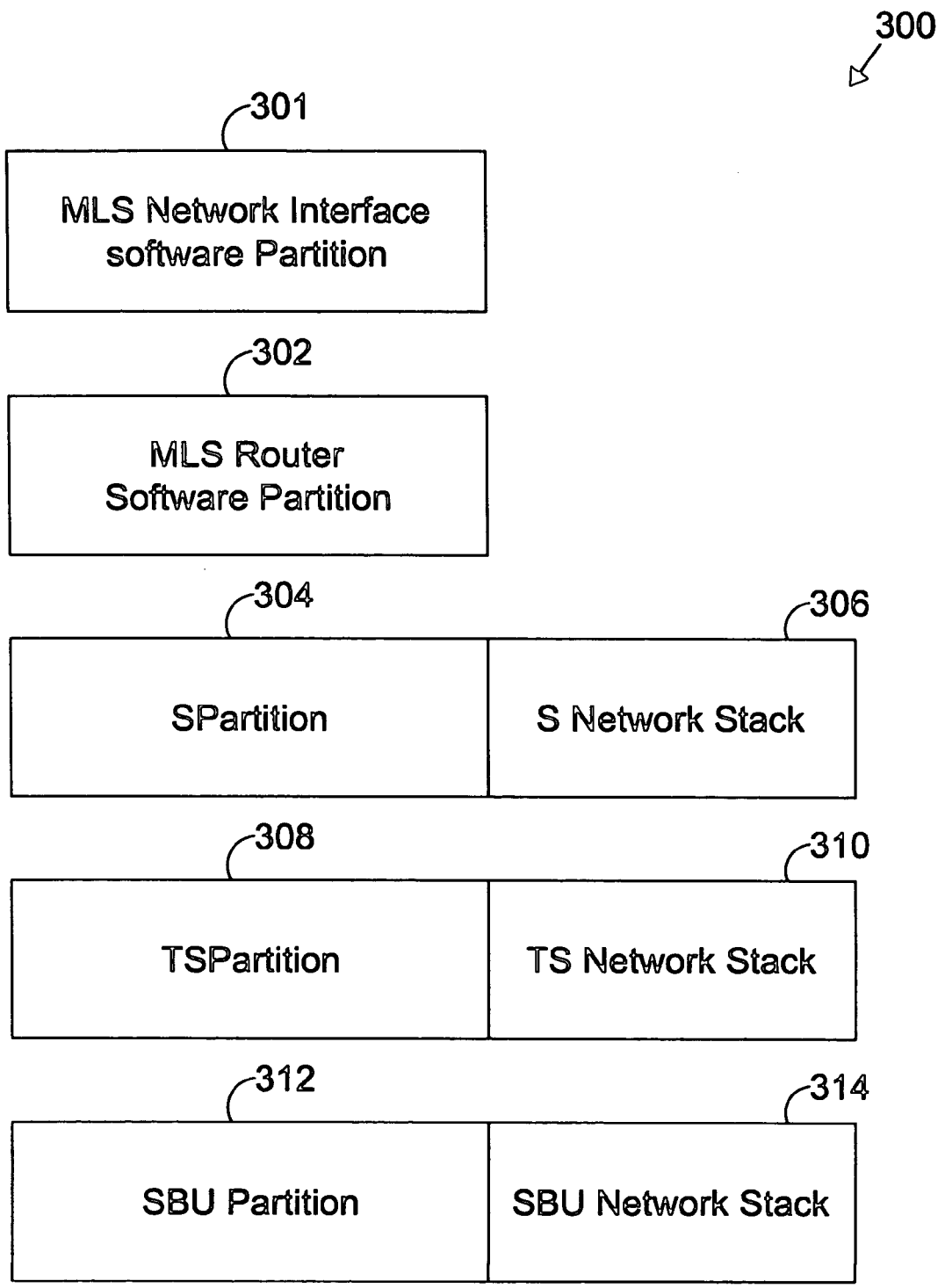
FIG. 3 illustrates a block diagram of a MILS router application in accordance with an exemplary embodiment of the present invention.

Referring now to FIG. 3, a block diagram of a MILS router application 300 is shown. The MILS router application 300 may implement MILS architecture and determine routing decisions for data received from MLS networks and MSLS networks. The MILS router application 300 includes a MLS network interface software partition 301, a MLS router software partition 302 and several MSLS software partitions 304, 308, 312.

The MLS network interface software partition 301 may receive data from the MLS networks through the MLS channel and forward the received data to the MLS router software partition 302. The MLS router software partition 302 makes routing decisions based on labels included within the data and determines a destination single security network for the data. The labels may be striped from the data. Consequently, the data may be modified to be MSLS data suitable for the destination single security network. The MSLS data is provided to one of the MSLS software partitions 304, 308, 312 configured to send the MSLS data to the destination single security network. The MSLS software partitions 304, 308, 312 are key enablers to enforce security policy among several single level security networks. Each MSLS software partition 304, 308, 312 may have a single and simple function to perform in maintaining separation of security levels. The secure gateway/router system includes several network interface units configured so that a single software partitions can perform a single function that is critical to maintain separation.

Each MSLS software partitions 304, 308, 312 may be configured to receive MSLS data from one of the MSLS networks (a single security network) and provide the received MSLS data to the MLS router software partition 302. The MLS router software partition 302 may attach a proper label to the MSLS data to generate MLS data suitable for the MLS networks. The generated MLS data may be sent to the MLS networks through the MLS network interface software partition 301.

In an embodiment of the present invention, the MSLS software partitions 304, 308, 312 may include S Network software partition (S partition) 304, TS Network software partition (TS partition) 306, SBU Network software partition (SBU partition) 312, and the like.

The SBU Network software partition 312 may send and receive the MSLS data through the unclassified network interface unit such as the SBU NIC output hardware. The S Network Software partition 304 and the TS Network software partition 306 may send and receive the MSLS data through the MILS network interface unit such as the MILS NIC output hardware. One of ordinary skill in the art will understand that the MILS network interface unit is configured to assure security policy. For example, when the MILS network interface unit receives data from the S Network software partition 304, it is configured to send the data only to the S Network. When the MILS network interface unit receives data from the TS Network Software partition 308, it is configured to send the data only to the TS Network. Similarly, when the MILS network interface unit receives data from the S Network, it is configured to send the data only to the S Network software partition 304. When the MILS network interface unit receives data from the TS Network, it is configured to send the data only to the TS Network software partition 308.

In an alternative embodiment, each classified network interface unit coupled to a single security level network may enforce the high assurance by allowing interfaces only with the single security level network. For example, the classified network interface unit is configured to send the data only to the S Network when it receives data from the S Network software partition 304, and the classified network interface unit is configured to send the data only to the TS Network when it receives data from the TS Network software partition 308. Similarly, the classified network interface unit is configured to send the data only to the S Network software partition 304 when it receives data from the S Network and the classified network interface unit is configured to send the data only to the TS Network software partition 308 when it receives data from the TS Network.

As describe above, the MLS router software partition 302 may determine a destination single security level network for the data packet based on labels within the data packet. The labels include security related information for the data packet. The labels may be striped (extracted) from the data packet. Then, the modified data packet is provided to the proper MSLS software partition configured to interface with the destination single security level network via the MILS middleware.

Figure 4:
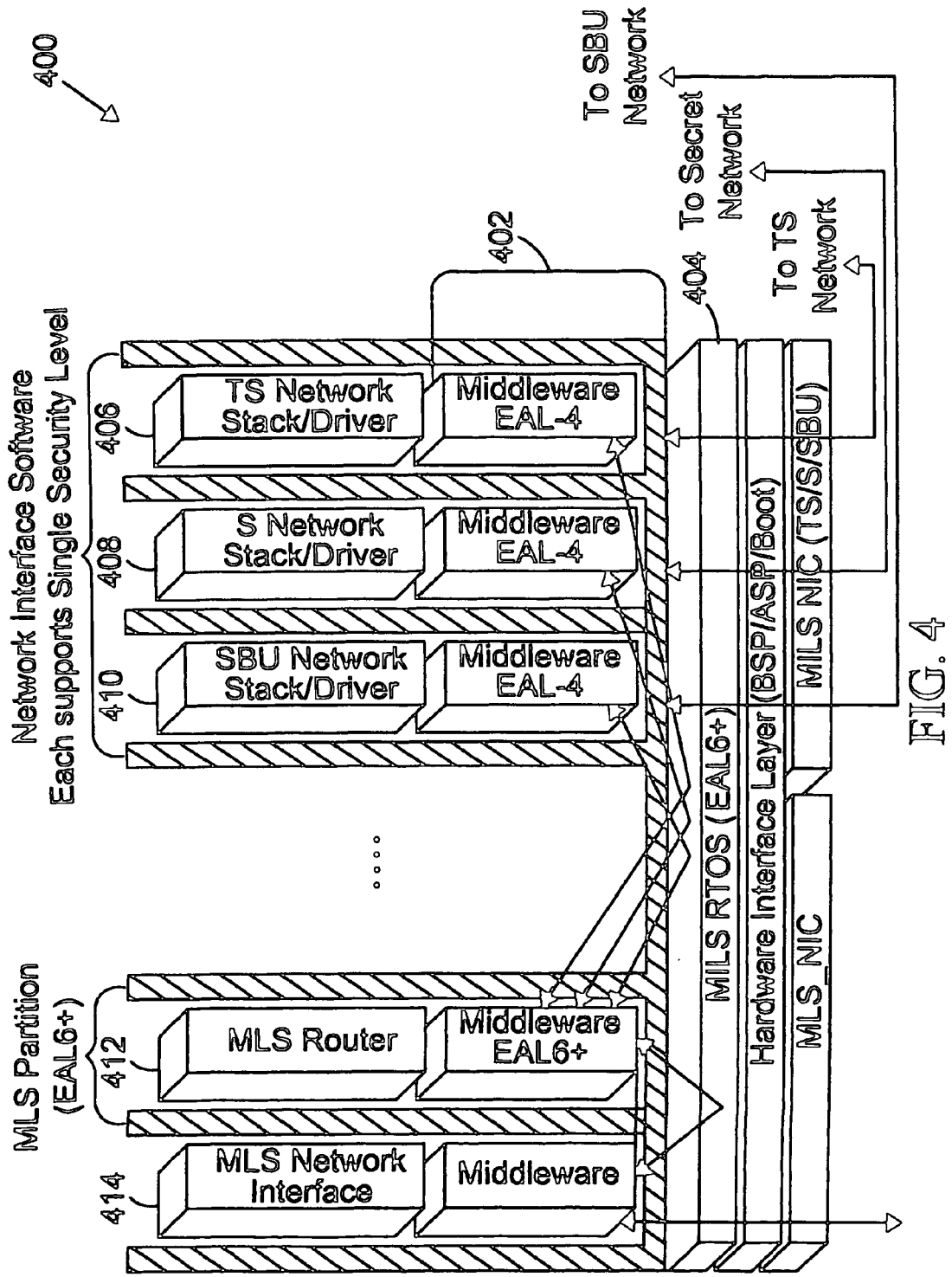
FIG. 4 illustrates a secure gateway system layer diagram in accordance with an exemplary embodiment of the present invention.

In an embodiment of the present invention, the MILS middleware, a MILS RTOS and the MILS router application may be embedded in the MILS router processor. As shown in FIG. 4, the MILS middleware 402 may logically sit on top of the MILS RTOS 404. TS network protocol stack 406, S network protocol stack 408, SBU network protocol stack 410, NLS network interface 414, and the like may logically sit on top of the MILS middleware 402. It is to be noted that network protocol stacks are too complex and large to achieve high evaluation assurance level certifications such as EAL-6 certification and EAL-7 certification. In an embodiment of the present invention, lower evaluation assurance level such as EAL-4 may be maintained in each MSLS software partition having network protocol stack. As such, MSLS software partition is allowed to maintain lower evaluation assurance level while MILS router application maintains EAL-6+ (i.e. Evaluation Assurance Level 6 augmented) via the MLS router software partition 412. In this manner, MILS router application is suitable for various military devices meeting size, weight, power and high certification requirements. The MLS network interface partition 414 may forward MLS data to the MLS router software partition 412.

It will be appreciated that MILS RTOS 404 may include various conventionally available MILS real time operating systems. The MILS middleware 402 may be suitable for enforcing end to end separation among MILS software partitions. It will be also appreciated that there are various ways to implement the secure MILS middleware 402 and the MILS RTOS 404 in the context of the MILS architecture. In an embodiment of the present invention, the MILS middleware 402 and the MILS RTOS 404 may be utilized to achieve the separation (partition) of the MILS router application at multiple security levels.

The security policy enforced by the MILS architecture may be based on information flow, data isolation, periods processing and damage limitation. Generally, information flow ensures that only authorized communication may occur. Data isolation protects data segments from corruption by unauthorized entities. Periods processing helps enforce information flow and data isolation by sanitizing shared resources such as processor registers between context switches. Damage limitation guarantees that a failure in unevaluated code does not compromise the continued processing of critical applications.

In an embodiment of the present invention, the MILS RTOS 404 may be in charge of data isolation, information flow control, periods process, and damage limitations on the MILS router processor and coordinating end to end separation among the partitions in the MILS router application. Further, the MSLS software partitions may exist concurrently as if they are completely isolated from each other. The MILS RTOS 404 provides inter partition communication services within the MILS router application.

Referring back to FIG. 3, each MSLS software partition may include a network protocol stack to transfer the MSLS data to the network interface cards. For example, the S partition 304 may include S network stack 306, the T partition 308 includes T network stack 310, and the SBU partition 312 may include SBU network stack 314. Each network protocol stack has visibility to a single network (with a single security level), which is enforced by the MILS RTOS and MMU embedded in the MILS router processor. The MSLS data is sent to the destination single security network by the network protocol stack to the destination single security network.

Figure 5:
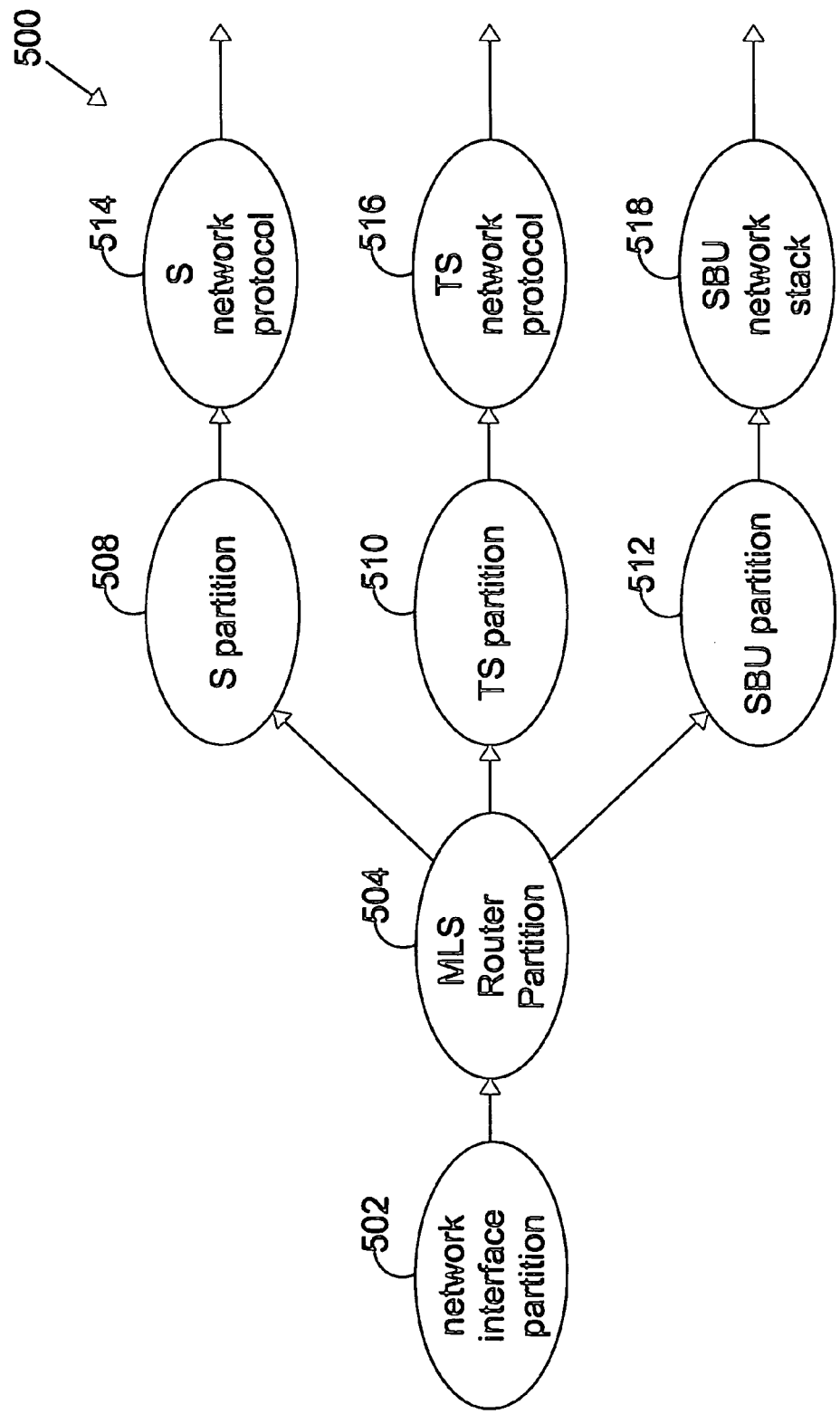
FIG. 5 illustrates a block diagram of the MILS router application implemented in the secure gateway system in accordance with an exemplary embodiment of the present invention.

Referring now to FIG. 5, a block diagram of the MILS router application 500 is shown. MLS network interface software partition 502 may receive data packet from the MLS network and forward the data packet to the MLS router software partition 504. The MLS router software partition 504 may make a policy based routing decision to determine a destination single security network based on the extracted information. The MLS router software partition 504 may extract security information (labels, and the like) from the data packet (messages) and modify the data into MSLS data. The MSLS data may be sent to a proper MSLS software partition 508, 510, 512. Each MSLS software partition 508, 510, 512 may include a corresponding network protocol stack 514, 516, 518 to transfer the MSLS data to the destination single security network.

Figure 6:
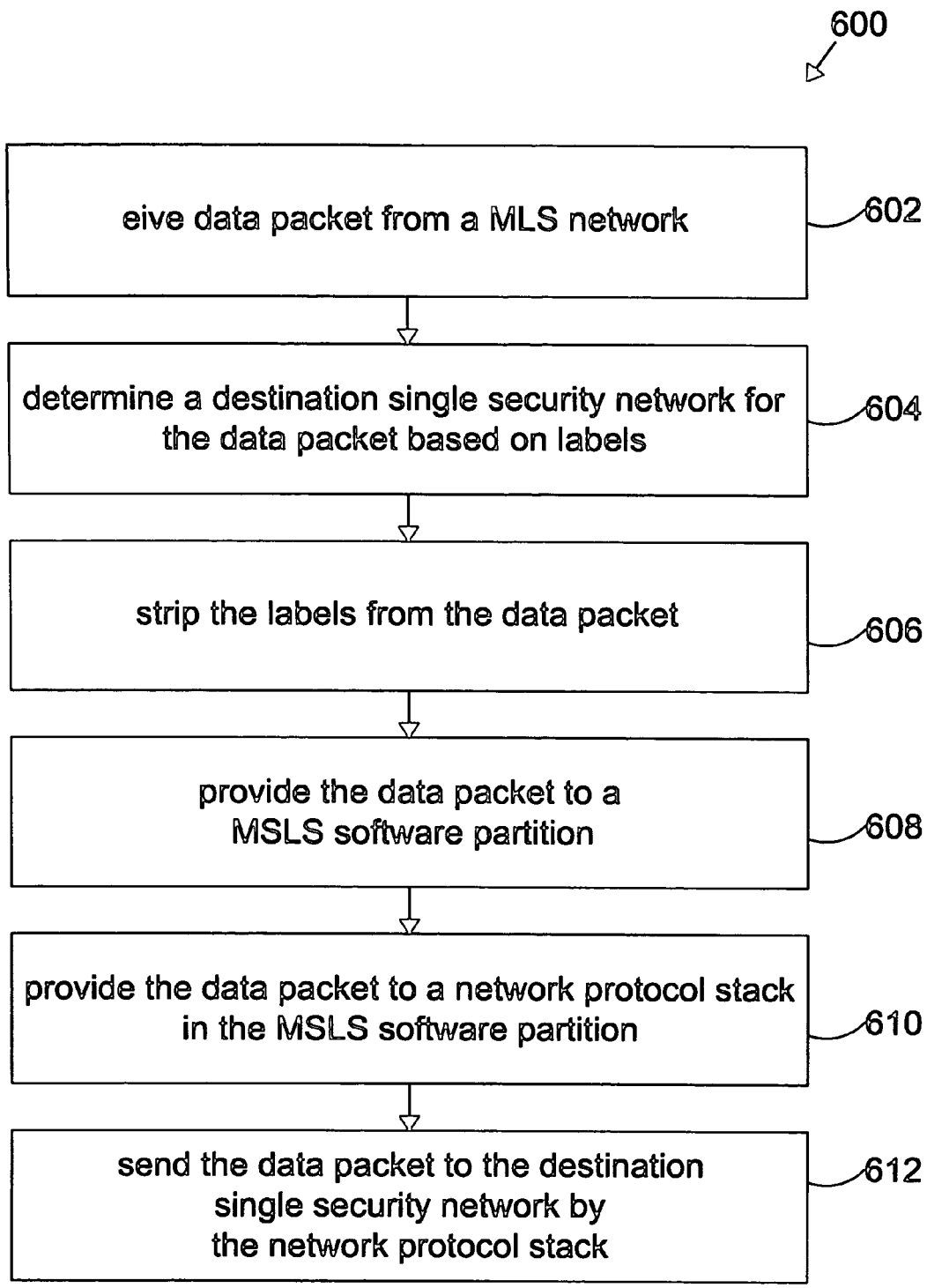
FIG. 6 illustrates a flow diagram of method implemented in the secure gateway system in accordance with an exemplary embodiment of the present invention.

Referring now to FIG. 6, a method implemented in a secure gateway/router system in accordance with the present invention is shown. In an embodiment of the present invention, data packets are sent from MLS networks to the MILS router processor. In step 602, the data packets are received by the MILS router processor from the MLS networks. Routing decisions made in the MILS router processor are based on labels within data packets. In step 604, MLS router software partition may determine a destination single security level network for the data packet based on labels included in the data packet. The labels may be extracted from the data packet in a MLS network protocol and the data may be modified to MSLS data without MLS labels in step 606. The MSLS data is provided to a proper MSLS software partition configured to interface with the destination single security level network in step 608. The MILS middleware may be configured to provide inter partition communication services within the MSLS software partitions. Then, the MSLS data packet is provided to a corresponding network protocol stack in the proper MSLS software partition in step 610. The MSLS data is sent to the destination single security network by the network protocol stack in step 612.

Figure 7:
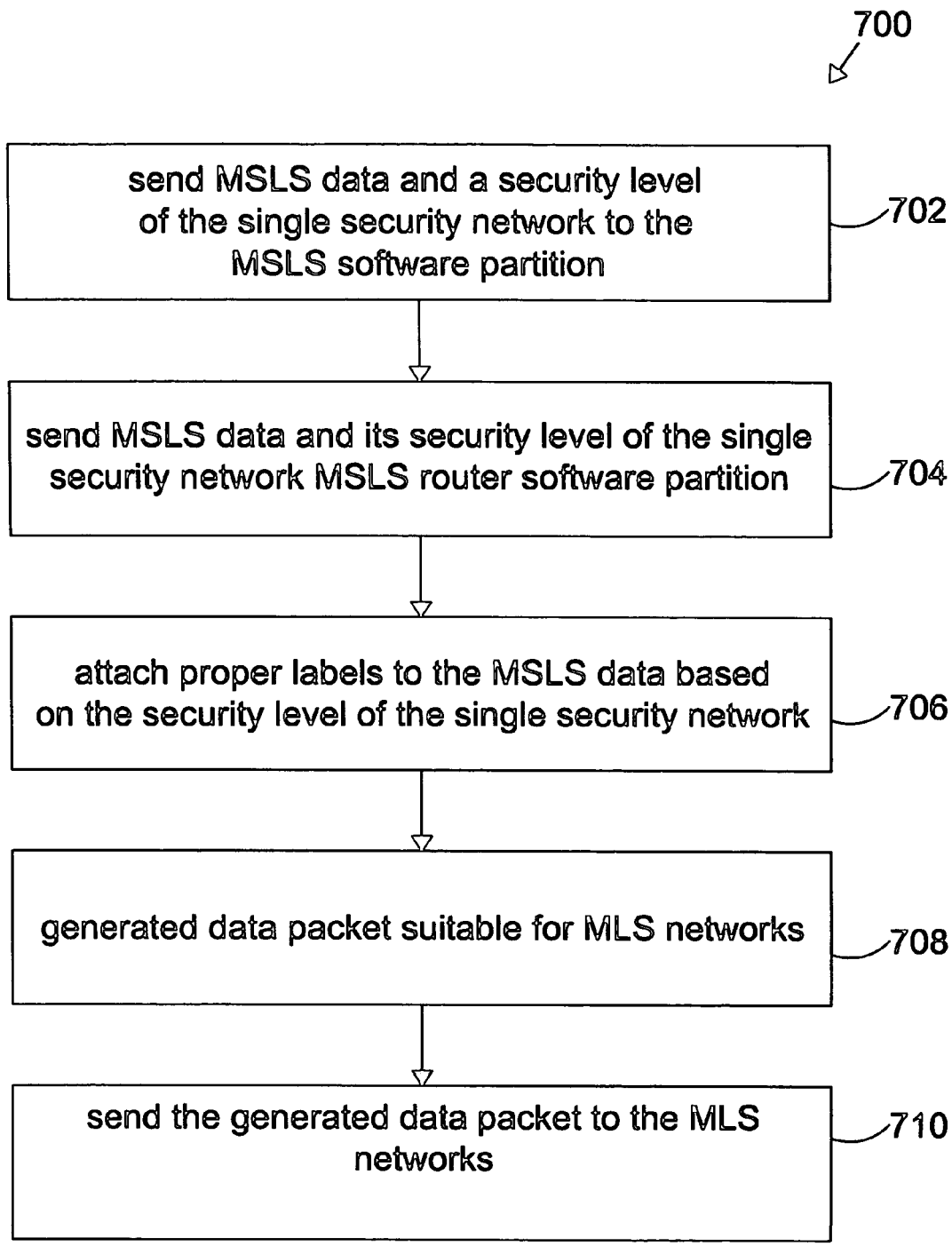
FIG. 7 illustrates a flow diagram of method implemented in the secure gateway system in accordance with an exemplary embodiment of the present invention.

Referring now to FIG. 7, a method 700 implemented in a secure gateway/router system in accordance with the present invention is shown. MSLS data is sent from a single security network to a corresponding MSLS software partition in the MILS router application in step 702. The MSLS data and a security level of the single security network (S, TS, or SBU) may be provided to the MLS router software partition from the corresponding MSLS software partition in step 704. In step 706, the MLS router software partition may attach proper labels to the MSLS data. The MSL data suitable for MLS networks may be generated in step 708. The generated MSL data is sent to the MLS networks through the MLS network interface software partition in step 710.

The present invention may provide various advantageous aspects. The secure gateway/router system may receive MLS data from new radios with legacy datalinks avionic equipment and route the received MLS data to one of several MSLS networks including S networks, TS networks and SBU networks. As such, devices in multiple single security level networks may be suitable for interfacing new radios with legacy datalinks avionic equipment while maintaining security separation and achieving high EAL certifications.

In the exemplary embodiments, the methods disclosed may be implemented as sets of instructions or software readable by a device in secured communication networks. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

It is believed that the secure gateway/router system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A secure gateway system, comprising:
    a Multiple Independent Levels of Security (MILS) router processor for bi-directional routing of a data packet based on a security level extracted from the data packet compared to a security level associated with a software partition within the router processor; the MILS router processor further including an MILS router application, the MILS router application including a Multiple Levels Security (MLS) network interface software partition, a MLS router software partition, a first Multiple Single-Level Security (MSLS) software partition configured to securely interface with a first MSLS network, a second MSLS software partition configured to securely interface with a second MSLS network, a third MSLS software partition configured to securely interface with an unclassified network; and a MILS Real Time Operating System (RTOS) for controlling the bidirectional routing of a data packet;
    a channel coupled to the MILS router processor and a MLS network, the channel for transferring the data packet between the MLS network and the MILS router processor; and
    a plurality of network interface units for interfacing between the MILS router processor and a plurality of MSLS networks;

wherein the plurality of MSLS networks include the first MSLS network, the second MSLS network and the unclassified network.

2. The secure gateway system as described in claim 1, wherein the plurality of network interface units include
a MILS network controller suitable for receiving the data packet from the first MSLS software partition and outputting the received data packet to the first MSLS network, the MILS network interface being suitable for receiving the data packet from the second MSLS software partition and outputting the received data packets to the second MSLS network, and
a network interface unit for receiving data packets from the third MSLS software partition and outputting the received data packets to the unclassified network.

3. The secure gateway system as described in claim 2, wherein the MILS network controller is suitable for receiving data from the first MSLS network and transferring the received data to the first MSLS software partition.

4. The secure gateway system as described in claim 2, wherein the MILS network controller is suitable for receiving data from the second MSLS network and transferring the received data to the second MSLS software partition.

5. The secure gateway system as described in claim 2, wherein the network interface unit for receiving data packets from the unclassified network and transferring the received data packet to the third MSLS software partition.

6. The secure gateway system as described in claim 1, wherein the MLS network interface software partition forwards the received data packet from the channel to the MLS router software partition.

7. The secure gateway system as described in claim 1, wherein the first MSLS network includes a Secret network.

8. The secure gateway system as described in claim 1, wherein the second MSLS network includes a Top Secret network.

9. The secured gateway system as described in claim 1, wherein the unclassified network includes a Sensitive-But-Unclassified network.

10. The secure gateway system as described in claim 1, wherein each of the first, second and third MSLS software partitions includes a network protocol stack.

11. The secure gateway system as described in claim 1, further comprising a crypto engine coupled to the MILS router processor for encryption and decryption of the data packet.

12. The secure gateway system as described in claim 1, wherein the plurality of network interface units include
a first network interface unit for transferring data between the first MSLS software partition and the first MSLS network;
a second network interface unit for transferring data between the second MSLS software partition and the second MSLS network; and
a third network interface unit for transferring data between the third MSLS software partition and the unclassified network.

13. The secure gateway system as described in claim 12, wherein the first MSLS network is a Secret network and the second MSLS network is a Top Secret network, and the third network is a sensitive but unclassified network.

14. The secure gateway system as described in claim 1, wherein MILS middleware is utilized to provide inter partition communication services within the MILS router application.

15. The secure gateway system as described in claim 1, wherein the MILS Real Time Operating System (RTOS) is a layer of computer readable code configured for routing the data packet between the MLS network interface and one of the first, second, or third software partitions, the routing based on the security level extracted from the data packet as compared to the security level associated with the software partition.

16. The secure gateway system as described in claim 1, wherein each of the first, second, and third software partitions further include a middleware layer of computer readable code configured for routing the data packet between the MILS RTOS and the network protocol stack in one of the first, second, and third software partition.

17. The secure gateway system as described in claim 1, wherein the MILS RTOS layer of computer readable code is a Target of Evaluation (TOE) documented under an Evaluation Assurance Level (EAL) and configured to protect a high value asset under a Protection Profile.

18. The secure gateway system as described in claim 1, wherein the MILS RTOS layer of computer readable code maintains a EAL documentation level of six or greater.

19. The secure gateway system as described in claim 1, wherein the high value asset under a Protection Profile is a data packet.

20. A method for providing a secure gateway system which supports interfaces among different security levels of domains including Multiple Single-Level Security (MSLS) networks and Multiple Levels Security (MLS) networks, comprising:
receiving a data packet from a MLS network;
determining a destination single level security network based on labels being included in the data packet;
extracting the security level from the labels included in the data packet to generate MSLS data;
providing the MSLS data to a MSLS software partition suitable for sending the MSLS data to the destination single level security network;
placing the MSLS data in a network protocol stack in the MSLS software partition; and
sending the MSLS data to the destination single level security network by the network router stack via a network interface unit,
wherein the network interface unit is configured to interface with the destination single level security network.

21. The method as described in claim 20, wherein the destination single level security network includes a Secret network, a Top Secret network and an unclassified network.

22. The method as described in claim 20, further comprising,
sending the MSLS data only to the network interface unit coupled to the destination single level security network through the MSLS software partition.

23. The method as described in claim 20, wherein the data packet from the MLS network is received by the MLS network interface software partition.

24. The method as described in claim 20, further comprising
receiving data from one of the MSLS networks;
providing the received data to a proper MSLS software partition;
providing the received data and a security level of the one of the MSLS networks to the MLS router software partition;
generating MLS data by attaching labels to the received data based on the security level of the one of the MSLS networks; and
sending the generated MLS data to the MLS network.

25. A system for providing a secure gateway/router system which supports interfaces among different security levels of domains, comprising:
- means for receiving a data packet from a Multiple Levels Security (MLS) network;
- means for determining a destination single level security network based on a security level as extracted from labels included in the data packet, extracting the labels from the data packet to generate Multiple Single-Level Security (MSLS) data, and providing the MSLS data to a MSLS software partition configured to send the MSLS data to the destination single level security network; and
- means for sending the MSLS data to the destination single level security network via a network interface unit,
- wherein the network interface unit is configured to interface within the destination single level security network.

26. The system as described in claim 25, wherein the destination single level security network includes a Secret network, a Top Secret network and an unclassified network.

27. The system as described in claim 25, wherein the MSLS software partition is configured to send the MSLS data only to the network interface unit coupled to the destination single level security network.

28. The system as described in claim 25, wherein the network interface unit is configured to send data to the destination single level security network if the network interface unit receives the data from the destination single level security network.

29. The system as described in claim 25, further comprising
- means for receiving data from one of the MSLS networks and providing the received data to a proper MSLS software partition;
- means for providing the received data and a security level of the one of the MSLS networks to the MLS router software partition;
- means for generating MLS data by attaching labels to the received data based on the security level of the one of the MSLS networks; and
- means for sending the MLS data to the MLS network,
- wherein the generated MLS data is suitable for the MLS network.

* * * * *